(12) United States Patent  (10) Patent No.: US 8,490,737 B2
Valcarenghi  (45) Date of Patent: Jul. 23, 2013

(54) FLOOR AND PAVEMENT TREATMENT AND CLEANING VEHICLE

(75) Inventor: Paolo Valcarenghi, Guardamiglio (IT)

(73) Assignee: Nilfisk-Advance A/S, Brondby (DK)

( * ) Notice: Subject to any disclaimer, the term of this patent is extended or adjusted under 35 U.S.C. 154(b) by 0 days.

(21) Appl. No.: 13/501,291

(22) PCT Filed: Sep. 24, 2010

(86) PCT No.: PCT/EP2010/064148
§ 371 (c)(1),
(2), (4) Date: Apr. 11, 2012

(87) PCT Pub. No.: WO2011/057854
PCT Pub. Date: May 19, 2011

(65) Prior Publication Data
US 2012/0199410 A1  Aug. 9, 2012

(30) Foreign Application Priority Data

Nov. 11, 2009 (IT) .............................. PN2009A0067

(51) Int. Cl.
*B60K 28/00* (2006.01)
(52) U.S. Cl.
USPC ........................................................ 180/282
(58) Field of Classification Search
USPC ................................. 180/282; 701/1, 72, 93
See application file for complete search history.

(56) References Cited

U.S. PATENT DOCUMENTS

| 6,175,796 | B1 | 1/2001 | Ishikawa | |
|---|---|---|---|---|
| 6,304,809 | B1 * | 10/2001 | Cullen et al. | 701/93 |
| 6,330,508 | B1 * | 12/2001 | Akabori et al. | 701/96 |
| 6,405,121 | B2 * | 6/2002 | Tamura et al. | 701/96 |
| 6,459,982 | B1 * | 10/2002 | Kobayashi et al. | 701/93 |
| 8,041,492 | B2 * | 10/2011 | Young | 701/93 |
| 2007/0208483 | A1 | 9/2007 | Rabin | |
| 2010/0145576 | A1 | 6/2010 | Doi | |

FOREIGN PATENT DOCUMENTS

| EP | 0 913 279 | 5/1999 |
|---|---|---|
| EP | 1 655 191 | 5/2006 |
| GB | 2 257 403 | 1/1993 |
| JP | 2007 92324 | 4/2007 |
| WO | 2008 026725 | 3/2008 |

OTHER PUBLICATIONS

International Search Report Issued Nov. 11, 2010 in PCT/EP10/64148 Filed Sep. 24, 2010.

* cited by examiner

*Primary Examiner* — Faye M. Fleming
(74) *Attorney, Agent, or Firm* — Oblon, Spivak, McClelland, Maier & Neustadt, L.L.P.

(57) ABSTRACT

A vehicle which includes an accelerometer to detect its lateral acceleration while in operation, a motor, and an input device activated by the operator of the vehicle and suitable to actuate in a controllable mode the mechanical power delivered by the motor so as to adjust the speed of the vehicle. Further, there is a processor including algorithms to compare the lateral acceleration signal detected by the accelerometer with a preset value corresponding to a preset lateral acceleration.

7 Claims, 8 Drawing Sheets

FLOOR AND PAVEMENT TREATMENT AND CLEANING VEHICLE

The present invention is relative to some vehicles and/or operating machines, generally controlled and driven by relevant operators, suitable for the industrial treatment of paved surfaces and floors, and in particular their cleaning, sweeping, washing, etc.

The present invention also concerns some procedures for the proper and effective use of said mechanical means.

Hereinbelow in the present description, and in the attached claims, specific reference will be made to the mechanical vehicles for the industrial treatment of paved surfaces, but it is understood that the invention is also applied in general to other types of uses, such as operating machines, soil and ground working machines, etc.

The problem of guaranteeing the sideways stability of the vehicles when turning or steering, and in general when changing their course, is widely known and studied.

For what concerns in particular land vehicles, this requirement can be particularly aggravated, and therefore investigated, if the support surface on which the vehicle rests and operates is an inclined plane with respect to the horizontal plane.

To guarantee said sideways stability, in the most diverse conditions and with very different types of vehicles, the solutions that have been explored are documented in numerous patents. Among these, hereinbelow are listed the most significant solutions in relation to the particular operating vehicles that are respectively considered:

1) GB 2 257 403: this patent examines in particular the situation of stability and the sideways anti-skidding (snaking) conditions in commercial vehicles, such as vehicles with trailer or vehicles that can radically modify their mechanical characteristics, such as their weight, the position of their centre of gravity, the moment of inertia with respect to said centre of gravity, etc., according to the conditions of application.

The solutions described therein are treated in a general manner and proposed as rule-of-thumb solutions; they are however applied to the generation of precursory signals that indicate a condition of instability, and they detect an existing condition of instability but they do not directly control the conditions of movement of the vehicle, or of one part of them; therefore the operator of the vehicle is always obliged to keep an eye on the indicators of such conditions of possible instability, but this requirement, as it must be carried out by a human operator and not automatically, never guarantees the performance of the relative operating conditions, nor the necessary prompt action.

2) EP 1 013 525 A2: this patent regards in particular normal vehicles designed to carry only persons, for which it is not required to have a major modification of their mechanical conditions and attitude.

However, this patent addresses in particular the maintenance of the requirements of stability when the speed of the vehicle is rather high, and therefore the most risky factor lies in the speed difference between the wheels, which in effect always means loss of grip and slipping.

To effectively tackle this problem, the above patent adopts a solution which is however characterized in being very complex and thus costly, with the use of numerous sensors of different nature, controlled by a processing unit which naturally implies considerable complexity and cost.

Moreover, in this case too there is no automatic vehicle steering assist.

3) WO 02/20318: this patent relates in particular to the conditions of stability of a vehicle already equipped with numerous automatic safety systems, such as ABS, traction control (TC) and yaw stability control (YSC). However, this patent also presupposes high complexity and costs, and in any case it does not provide for any automatic reaction on the performance of mobility of the vehicle; moreover, the performance offered at the practical level is neither useful nor required in substantially slow vehicles such as the vehicles considered in the present patent.

4) U.S. Pat. No. 3,717,104: this patent can be used as a stabilization system in vehicles that travel on a pair of rails; in fact, it illustrates a procedure for improving the stability of such a vehicle, which consists of:

applying a small rotation with respect to a longitudinal axis of the vehicle (which in this case is also parallel to the axis of the instantaneous speed vector) and which passes through its centre of gravity;

shifting the entire vehicle in a direction opposite to the centrifugal acceleration vector, so that the force resulting from the combination of the centrifugal force and of its weight is projected on the centre line between the two rails, or close to it.

This solution, though effective and simple (in fact it uses a single accelerometer and does not use sophisticated data processing means), can be used only in the presence of vehicles that travel on rails, and thus it cannot be used with the type of vehicles that move freely on a typically flat surface, which are the types considered in the present invention.

5) US 2003/0078700 A1: this patent relates to a procedure for signalling a possible yaw of a vehicle travelling on a typical road surface. The signalling of the yaw in this case is detected not with a gyroscope, as would be naturally assumed considering that the yaw consists of the rotation of the vehicle around an axis perpendicular to the plane of the ground, but with the use of two distinct signals generated by two respective accelerometers positioned at two points at a definite longitudinal distance in the vehicle.

This solution is not useful or interesting for use in vehicles considered in the present patent, as their low speed does not create yaw problems, and in addition it presupposes a high complexity and therefore relatively high construction costs.

6) WO 2006/110099 A1: this patent regards a complex system for controlling generally the trim and movement of a vehicle of general type. Though this system could conceivably satisfy some of the functional requirements considered in the present patent, it is however naturally very complex, costly and also difficult to utilize by an average operator of a floor treating machine.

7) GB 814 496 (A): this patent concerns the yaw control of a wheeled vehicle; it employs a completely hydraulic and mechanical, and thus intrinsically slow and scarcely reliable, control system.

However, the greatest drawback of this system lies in the fact that it requires the use of a gyroscope, which as is well known is a very complex and delicate device and which, most of all, it can substitute the driver to automatically control the rotation of the steering wheels.

This solution is totally unacceptable for the vehicles considered in the present patent, since their use does not absolutely allow their path to be automatically modifiable at every instant by a device external to the control of the driver; on the contrary, it is necessary that the path decided by the driver be faithfully followed, and that the stability of the vehicle be assured by acting on other vehicle driving parameters.

In general, the above-mentioned solutions do not consider the peculiar characteristics of floor treatment vehicles. In fact, said vehicles must follow a path that is often very complex, with tight curves, even at right angles or narrower, and at any rate with extremely limited turning radiuses, which is not a condition found in normal driving conditions, where, on the contrary, it is preferred to have turning radiuses as wide as possible.

In addition, floor treating vehicles usually need to have a support base as limited as possible to make it easier to insert them into limited spaces in order to access hard-to-reach surfaces.

For this reason, said operating machines are often made with only three wheels; in addition, the length of said support base is normally much greater than the width.

This circumstance naturally makes the vehicle very unstable with respect to the centrifugal force to which it is subjected when it is steered.

Finally, considering that the centrifugal force increases inversely to the square of the turning radius, that is the steering radius, the peripheral velocity being equal, it becomes immediately clear to an expert in the field that even a modest velocity of the vehicle can generate, in a sudden turn, a centrifugal force and therefore a considerable centrifugal acceleration.

This data, combined with the above-mentioned limited transversal vehicle base width, makes the vehicle intrinsically very unstable in a transversal direction.

It would therefore be desirable, and it is the main objective of the present invention, to realize an operating machine, particularly for floor treatment, such as a buffing machine, or a sweeper, etc., provided with means suited to ensure or at least improve the lateral stability in a fully automatic manner, without modifying the trajectory of the machine and therefore without acting on the steering wheels.

This machine must also be able to guarantee its operation on surfaces that are inclined with respect to the horizontal plane and with one of its components turned transversally to the direction of movement of the machine.

In addition, this machine must be controlled in a simple and automatic manner, and must be made economically using the means available in the art.

These and other objectives are achieved by a machine in accordance with the attached claims.

Some characteristics and advantages of the invention will become evident from the following description, given by way of non-limiting example, with reference to the enclosed drawings, wherein.

As mentioned at the beginning, the present invention has the objective of improving the stability of an operating vehicle, in particular a floor-washing or a floor-brushing machine.

This objective is achieved on the basis of the circumstance that the physical quantity most directly responsible for the loss of grip or stability (that determines the tipping over) of a vehicle of this type is the acceleration in a direction perpendicular to the instantaneous direction of movement of the vehicle. When this acceleration exceeds a certain limit, depending on the constructive characteristics of the vehicle and other contingent factors, such as the grip of the wheels on the ground, there is the loss of grip or the lateral tipping over of the vehicle, depending on the greater or lesser lateral grip coefficient of the wheels with respect to the quantity of centrifugal acceleration applied to the centre of gravity, and also to the distance of the same above ground level.

Figure 1:
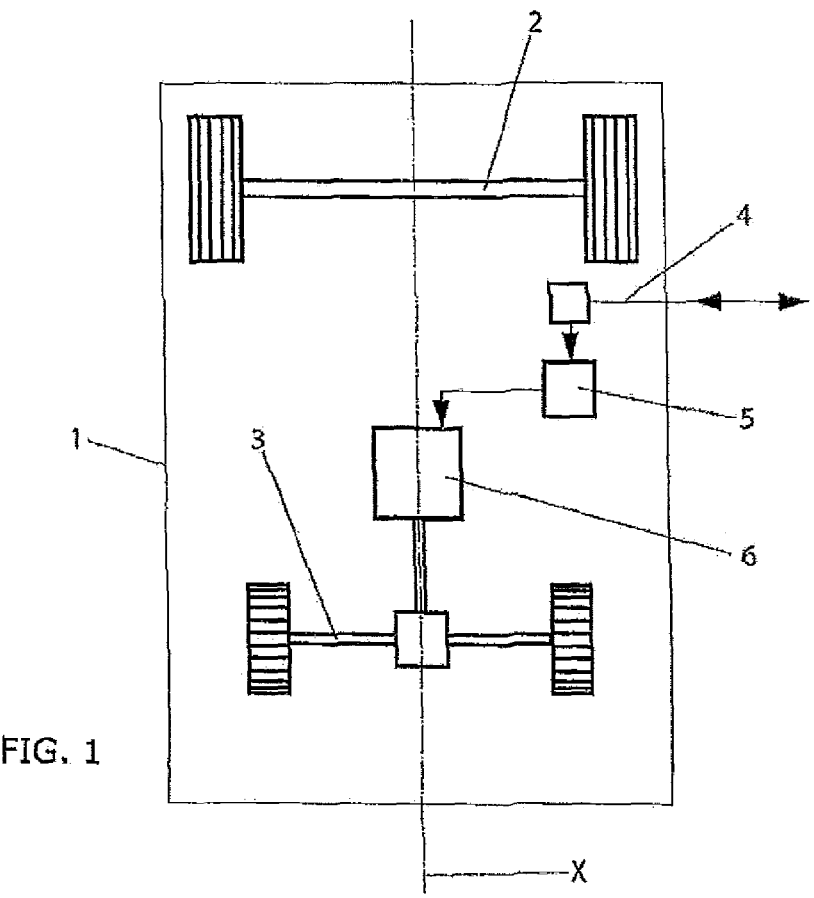
FIG. 1 shows a symbolic diagram from above of a basic vehicle structure according to the present invention.

With reference to FIG. 1, an operating vehicle according to a preferred embodiment of the invention employs the following means:

a frame 1 suited to support at least preferably parallel two axles 2, 3 on each of which is mounted one or more wheels;

a rectilinear direction of travel "X", referring to said frame, and defined by the orientation of said wheels when they are oriented parallel to each other.

Naturally, other configurations of the frame and the relative axles are possible; in any case, the vehicle must be able to proceed in a rectilinear direction of travel "X";

an accelerometer 4 oriented:
  at right angles with respect to said direction "X",
  and in a horizontal direction when said wheels are resting on a horizontal working surface and the vehicle is stationary with respect to said working surface, and in which said accelerometer is suited to generate an electric signal depending, also in a non-linear form, on the lateral acceleration given and detected by said accelerometer;

a command and control unit 9 (hereinafter also called simply unit 9) suited to receive said electric signal generated by said accelerometer and to process said signal according to predefined algorithms;

traction means 6 suited to operate in a controlled manner on one or preferably more driving wheels;

(In operating machines in which an elective embodiment of the invention is applied, said traction means are preferably one or more electric motors, or a hydraulic drive is employed interlocked with a suitable internal combustion engine, without thereby excluding the use of other types of traction means, and therefore also a conventional internal combustion engine that transfers the power delivered to the wheels through traction means that will be better explained hereinbelow.)

control means 7 operated by the machine operator and suitable to control the power delivered by said traction means 6; in general, in operating machines typically considered by the invention said control means include a single pedal, operated by the operator, that operates on said traction means.

Heretofore, a general description of a vehicle according to the known technique has been described, wherein there is no functional connection between the control of said traction means, and therefore the power delivered by the same, and the signal generated and transmitted by said accelerometer.

On the other hand, the present invention sets itself the objective of:

setting, for the vehicle having the characteristics of the invention, the maximum value of lateral acceleration that it can tolerate in full safety (this maximum value can be found in a completely theoretical manner or, more simply and effectively, it can be determined and verified through specific experiments on a vehicle having the same characteristics as the one provided with the invention);

establishing and controlling the speed of the same vehicle so that it is limited to the point at which said maximum value of lateral acceleration is never exceeded, and these control actions must be actuated completely automatically, that is without any action by the operator, and independently of the any manoeuvres by the operator typically on the steering wheel and on the traction means.

For this purpose, a relationship is established and predetermined between the signal generated by the accelerometer 4 and the power delivered by said traction means 6.

Figure 2:
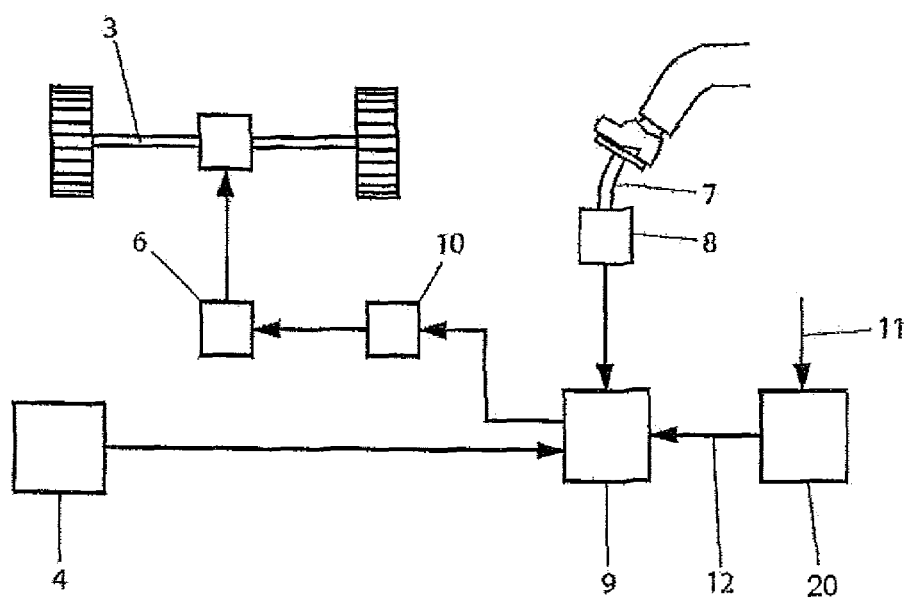
FIG. 2 is a symbolic block diagram of the connections between the basic components of the invention.

With reference to FIG. 2, a control unit 9 is realized designed to receive both the signal coming from the accelerator 4, and the signal coming from a suitable transducer 8 that senses the instantaneous position of the pedal 7, or the pressure on the pedal, depending on the type of control.

Both these signals are computed and processed by said unit 9 according to a predetermined algorithm that will be better described and specified hereinbelow; the result of the computation is transmitted to a suitable servo control 10 suitable to act directly on the traction means 6.

However, it should be immediately explained that said signals are not processed together, and specifically the signal originated by the accelerometer is measured in real time, and, on the basis (according to said algorithm) of the instantaneous value detected, a second signal is generated and sent to said servo control 10 forming the control signal controlling the power that must be delivered by the traction system 6 of the vehicle.

A purely constructive variant consists of integrating the control unit 9 with said servo control 10; in any case, independently of the type of construction, said two units 9 and 10 are designed and built so as to generate an electrical signal, or an equivalent command, that acts on the final device of the chain, that is, on the traction means 6 that acts directly on the wheels, without the interposition of any other mechanical or electrical means.

In this manner, a solution is achieved in which the traction means is controlled on the basis of both the controlling action of the pedal 7 and the centrifugal or lateral acceleration detected and transmitted by the accelerometer 4.

Figure 3:
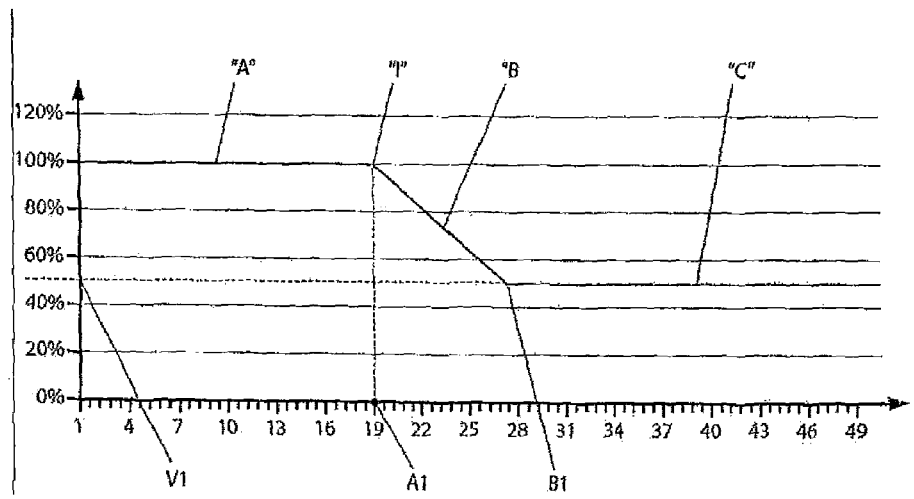
FIG. 3 illustrates on a Cartesian diagram the graph that represents the relationship of the maximum speed allowed for the vehicle based on its detected lateral acceleration, according to the invention.

For what concerns the type of algorithm, and therefore the command system of said control unit 9, reference is made to FIG. 3.

FIG. 3 shows a system of Cartesian coordinates in which the axis of abscissas represents the value of the lateral acceleration in absolute value (in this case expressed in hundredths of "g"), and in which the axis of ordinates represents the output function from said control unit 9 that controls the power delivered by the traction means 6, expressed as a limitation of the real speed of the vehicle with respect to the speed requested by the operator through the pressure on the pedal 7.

As can be seen, the graph shown therein consists of a broken line formed by three segments in succession; each of the three segments represents a mode of operation of the invention, as follows:

Segment A): the operating speed is not modified; in fact, once a given value "A1" of lateral acceleration is preset, here exemplified by the value of 0.18 g, when in this segment the lateral acceleration is maintained below said value, said control unit 9 supplies a signal that faithfully represents the position control of the pedal 7;

Segment B): the operating speed is modified in a linear manner with respect to the position of the pedal 7; in fact, when in this segment the lateral acceleration is maintained between the previous value "A1" and a new and higher lateral acceleration value "B1", said control unit 9 supplies a signal suitable to limit proportionately the machine speed;

Segment C): the machine operating speed is subjected to the complete control of the control unit 9; in fact, when in this segment the lateral acceleration is maintained higher than said value "B1", said control unit 9 supplies a signal suitable to maintain the speed of the vehicle at a predetermined constant value "V1".

It can now be seen, and immediately clear to an expert in the field, that the vehicle provided with the invention, in the absence of transients with high peaks of acceleration, will always tend to work in the limited zone that includes the intersection "I" between segment "A" and segment "B", and, if the signal on the pedal 7 is permanently activated for the maximum speed, it will tend to remain in this intersection "I" until either the speed control signal is reduced or the centrifugal acceleration is reduced.

In fact, if the inventive device senses a centrifugal acceleration that corresponds to segment "B", it instantaneously reduces the speed of the vehicle, which automatically reduces the centrifugal force detected, and then the speed of the vehicle is increased again until a new correction is made.

Essentially, the speed of the vehicle and its lateral acceleration are maintained in a stable equilibrium, meaning that they can be continually modified so that the point that represents them on the diagram of FIG. 3 tends continually toward said position "I", oscillating around it.

The fundamental objective of the invention should be underlined: in fact, it tends to avoid bringing the vehicle up to the extreme condition before the point of tipping over, while yet preventing it, but to achieve a condition of travel that shows a high safety coefficient (Point "I") well before reaching the risk of tipping over.

Figure 4:
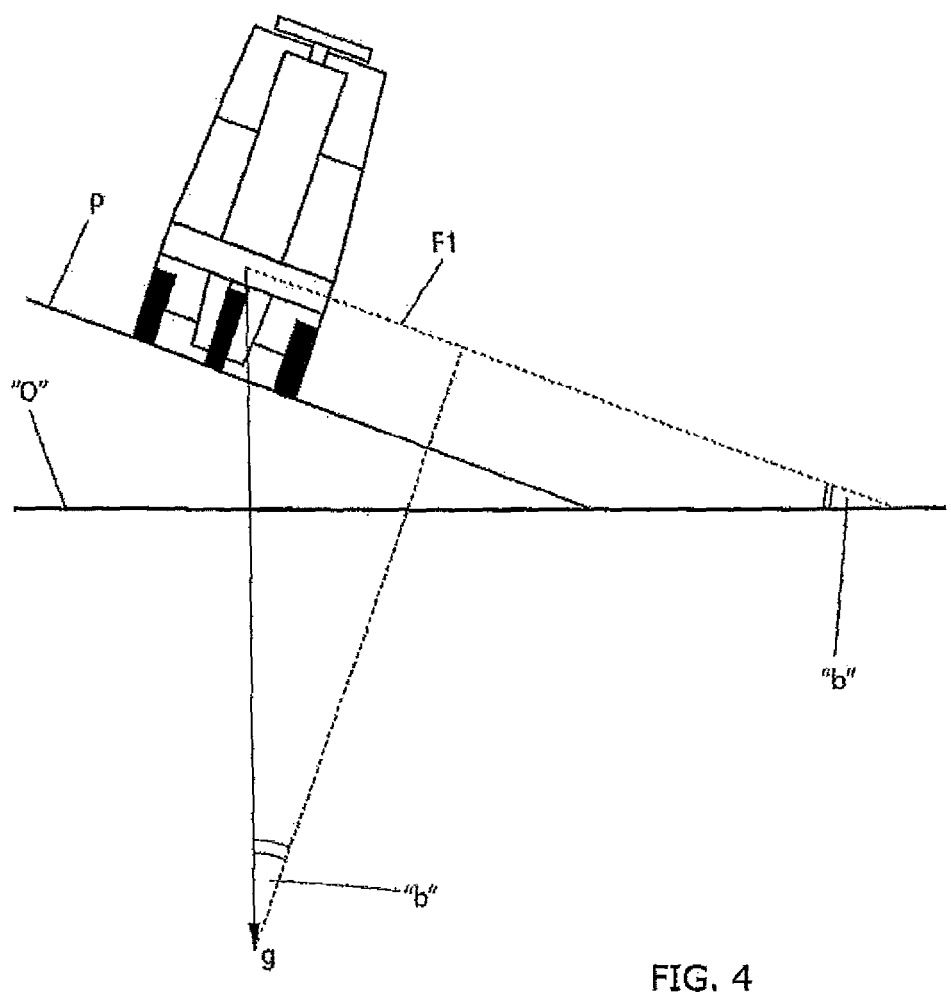
FIG. 4 is a symbolic vertical plane view of a vehicle on a laterally inclined plane with respect to the horizontal plane, and of the composition of the forces, in particular lateral ones, that act on said vehicle.

The advantages of the present invention, with respect to other non-automatic control systems, like the reduction of the speed connected to the steering angle of the vehicle, are thus the following:

1) absence of intervention of the inventive devices when the speed of the vehicle is sufficiently reduced so as not to create hazardous situations (that is, excessive lateral acceleration), independently of the turning radius activated;

2) intervention proportional to the effective extent of the risk, and real-time automatic control of the vehicle speed so as to always maintain the maximum speed allowed by the selected safety conditions, as a function of the centrifugal acceleration detected;

3) "safety" intervention even when the vehicle is moving on a laterally inclined plane; in fact, if the vehicle, even if moving at a constant speed in a straight line, travels on a plane laterally inclined by an angle "p" with respect to the horizontal plane "o", as shown schematically in FIG. 4, it is still subjected to a lateral force "F1" that corresponds to the projection of the force of gravity "g" on the working plane "p".

Said lateral force "F1" is the force perceived by the accelerometer 4 in a condition of a vehicle travelling in a uniform rectilinear motion, and corresponds evidently to:

$$F1 = g \cdot \cos b,$$

if "b" is the angle of inclination of the plane "p" with respect to the horizontal plane "o".

Said lateral force F1 is thus detected by the accelerometer, and is thus used by the inventive devices to slow down the motion of the vehicle, thereby contributing to increase its operating safety.

4) The existence of Segment "C" in FIG. 3 also provides the following additional advantages:
- in case of movement on a laterally inclined plane, it is essential that the speed be kept from slowing down below a limit necessary for the vehicle to disengage itself in particular conditions, such as for example a slippery or very wet surface;
- in addition, in case of peaks of acceleration caused also by sudden changes of direction, it is better that the speed be prevented from undergoing excessive "decelerations", as otherwise this could determine more risks than benefits for the stability of the vehicle, since in this case the acceleration in the direction of travel is summed up vectorially with the lateral acceleration. And moreover the comfort of the operator would be appreciably lowered.

Figure 5:
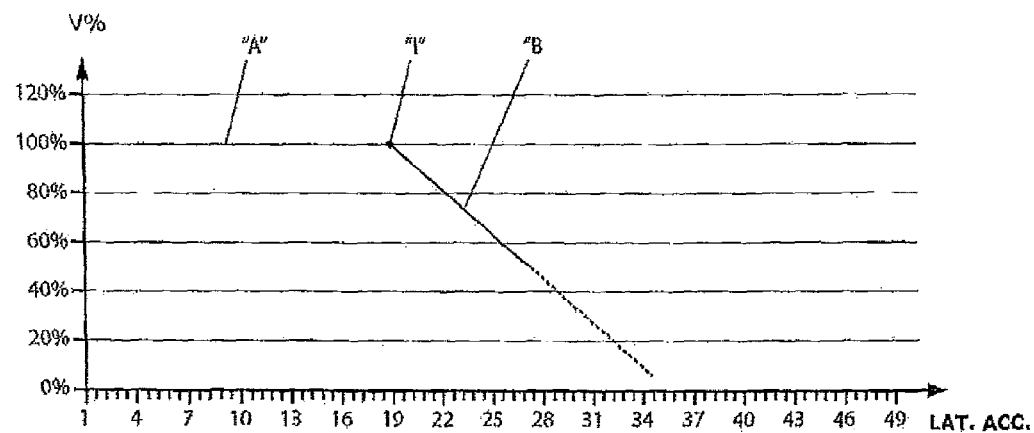
FIG. 5 is a graph similar to the graph of FIG. 3, but with a simplified mode of operation of the invention.

The invention, as exemplified in the graph of FIG. 3, can also be realized, in a more simplified embodiment, represented in FIG. 5, with similar devices which however include only the Segments "A" and "B", meaning that they do not include segment "C".

Naturally, in this case the benefits described above are lost, and however it cannot be ruled out that, at least conceivably, a basic operation of the invention represented by the two Segments "A" and "B" alone is still advantageous in certain circumstances.

Thus the operation of the vehicle, represented by the graph of FIG. 3, should be considered an improved embodiment of the invention.

This also allows numerous other advantageous improvements:

a) the line broken into segments shown in FIG. 3 may be chosen because it is simpler to realize and because it is the one most comfortable for the operator; and moreover, also because the sudden, though modest, variation in the vehicle speed already serves to indicate to the operator that the inventive devices have intervened, and therefore immediately signals that the vehicle has travelled into a "controlled risk" area.

Figure 6:
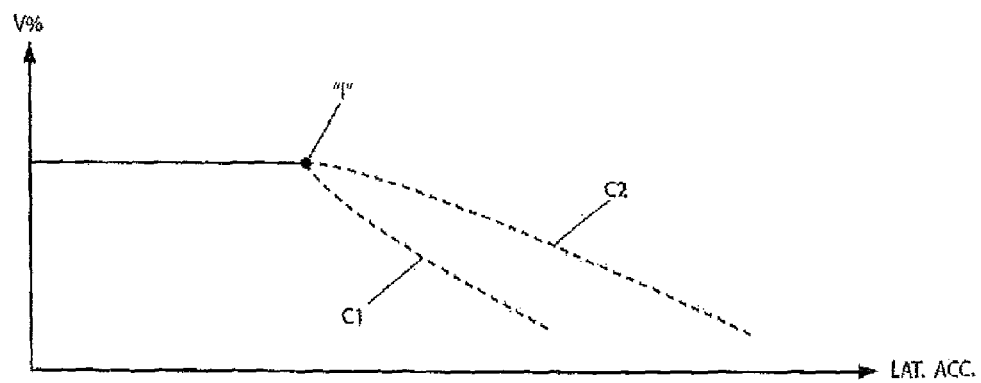
FIG. 6 shows further graphs similar to the graph of FIG. 3, but according to improved variants and modes of the invention.

However, other forms of embodiment of the graph of intervention of the invention, singling out particular running conditions and then realizing the appropriate corresponding algorithms that represent that specific type of graph are possible. For example, with reference to FIG. 6, it is possible to identify a non-linear relation between centrifugal acceleration and speed as represented by the curve "C1".

In fact, in this case at point "I" the speed of the vehicle does not decrease linearly with the increasing speed of the vehicle, but said speed decreases initially more markedly, that is with a greater deceleration, and then proceeds with a more limited, and progressively more limited, deceleration (of speed, but not of angular deceleration).

With such a relation, the vehicle is allowed to abruptly decrease its speed when it exceeds the maximum intervention speed, and it may be preferred, for example, when wishing to "warn" the operator, by means of this abrupt decrease in speed, detected by point "I", that the vehicle has entered a running condition controlled by the inventive devices, in other words that a condition has been reached which could precede the condition of danger.

This first type of operation is represented in FIG. 5 by the curve "C1", which has an upward-facing concavity, as can be easily seen.

On the other hand, the curve "C2" can be chosen when wishing to operate the vehicle at a higher speed, that is, when the vehicle is always working in optimal conditions, such as when, for example, the surface on which the vehicle works is completely flat and horizontal, and the condition of the ground can also allow a definite and limited "trespassing" toward a completely temporary condition of greater risk, but also of greater productivity of the vehicle.

This second type of operation is represented in FIG. 5 by the curve "C2", which presents a downward facing concavity, as can be easily seen.

Essentially, and in the widest general terms, the algorithm that defines the relation between the speed and angular acceleration of the vehicle may be chosen at will in accordance with all possible conditions of both the vehicle and the ground.

Figure 7A:
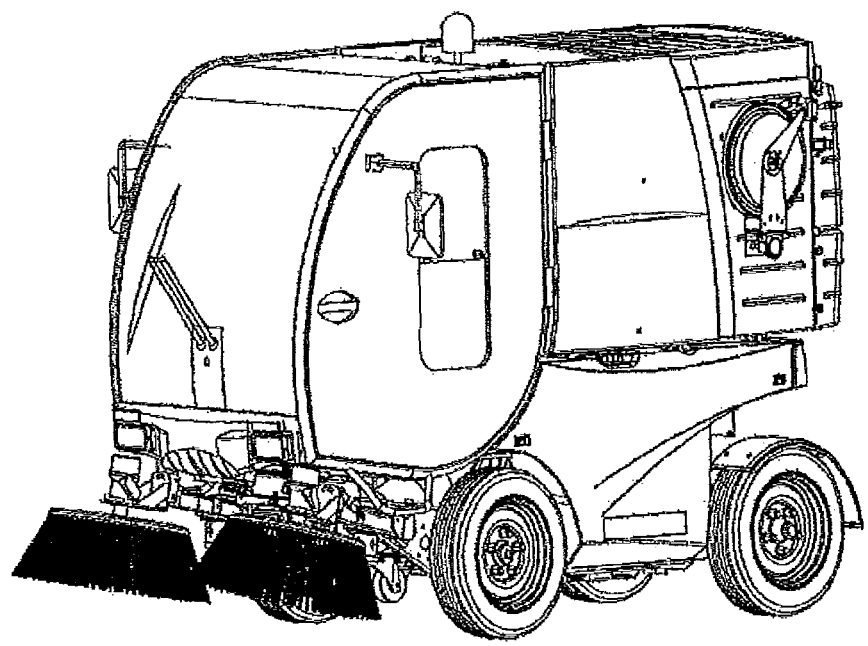
FIGS. 7A, 7B and 7C illustrate respectively a perspective view and the two plane orthogonal views of an operating vehicle suitable for implementing the invention.
Figure 7C:
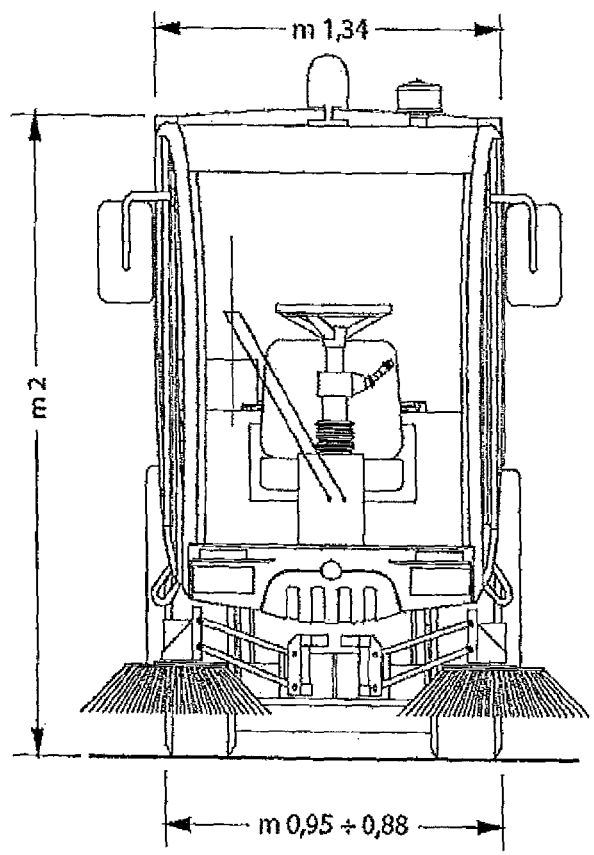
Figure 7B:
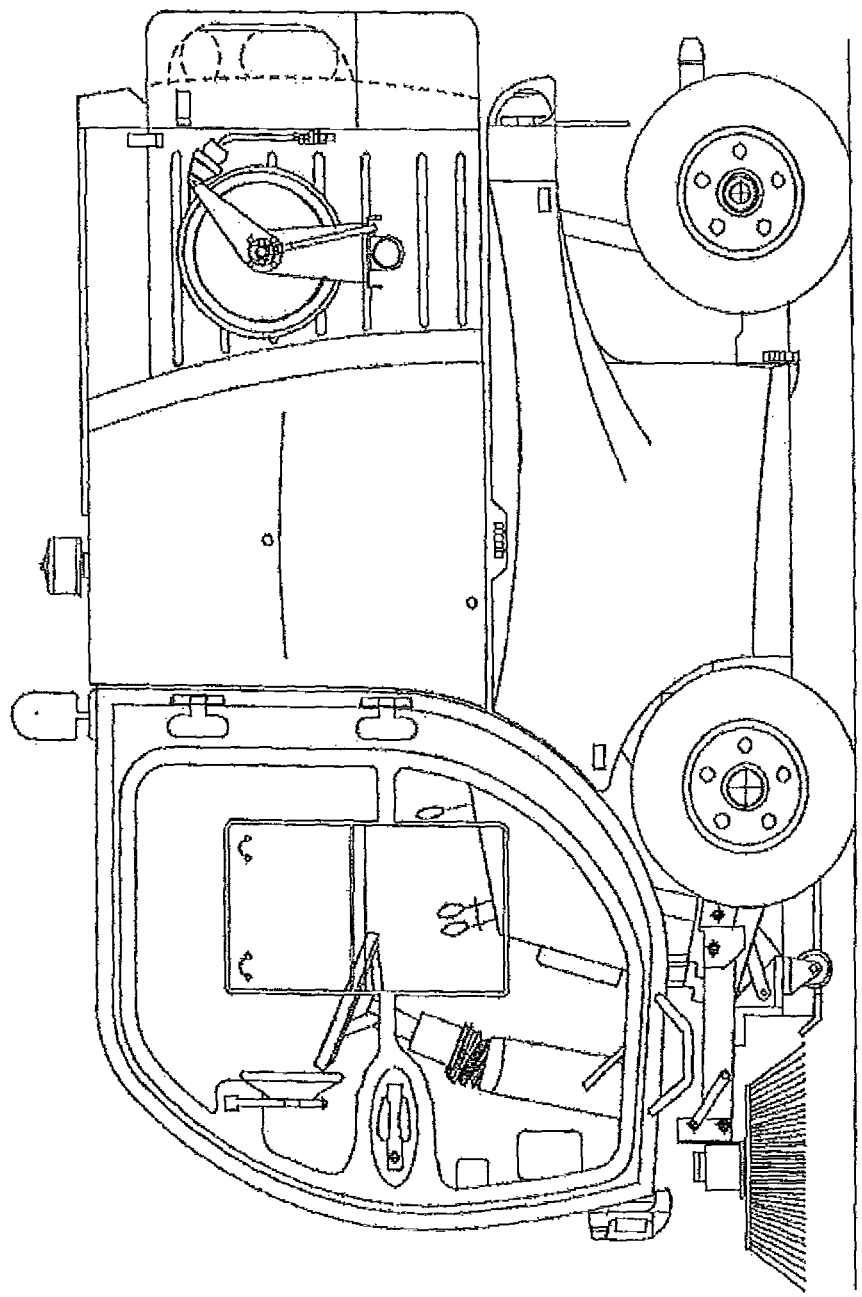
Figure 8A:
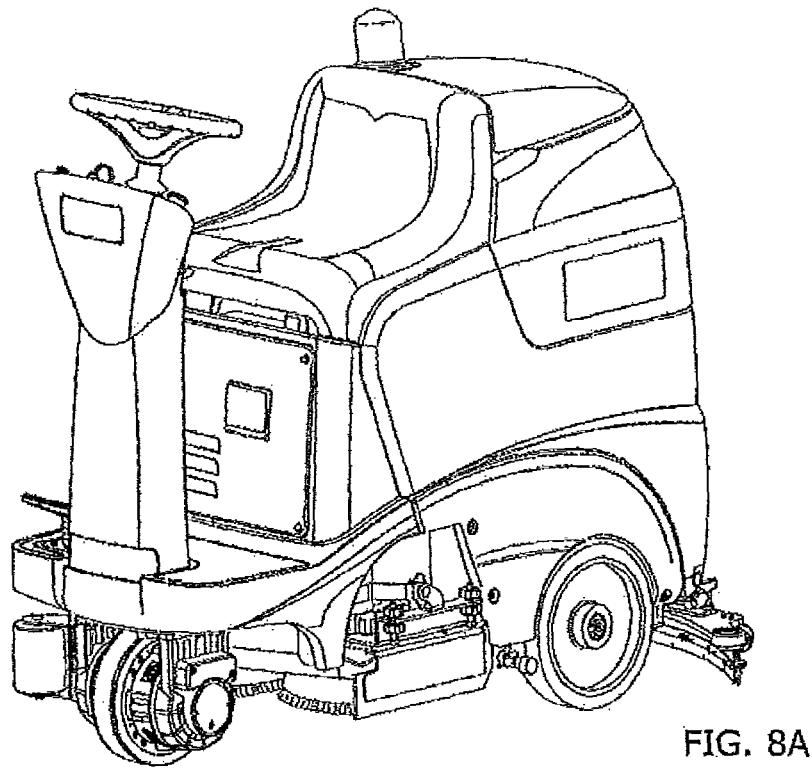
FIG. 8A illustrates a perspective view of a second type of operating vehicle particularly suitable for being equipped with the invention.
Figure 8B:
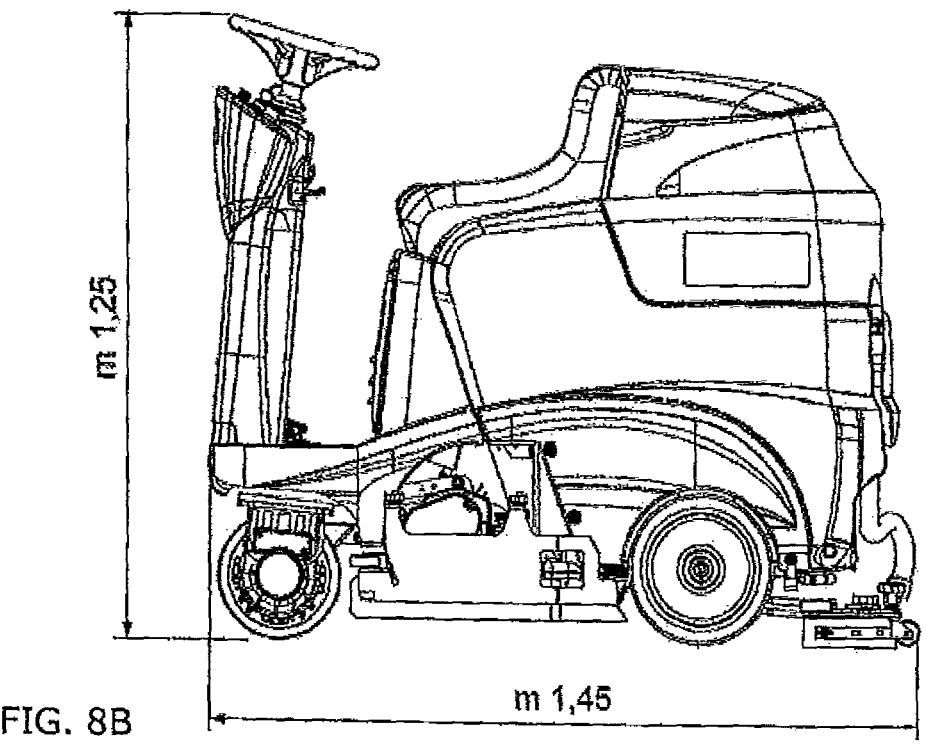
FIGS. 8B, 8C and 8D illustrate respectively orthogonal plane views of the vehicle of FIG. 8A.
Figure 8D:
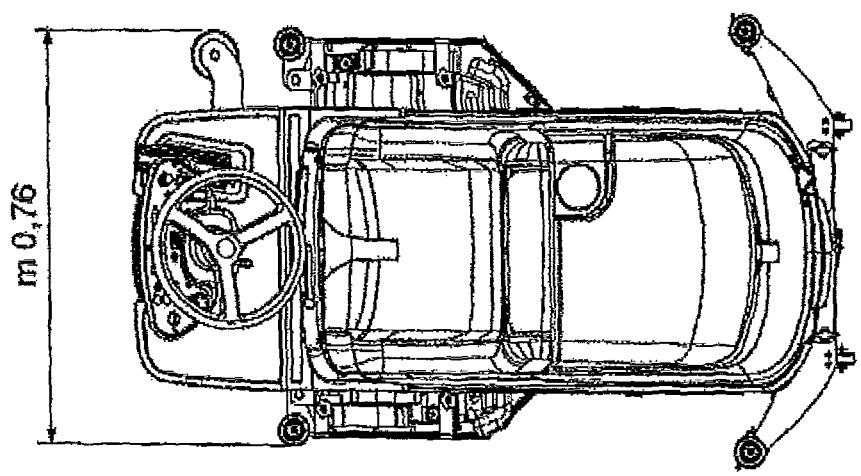
Figure 8C:
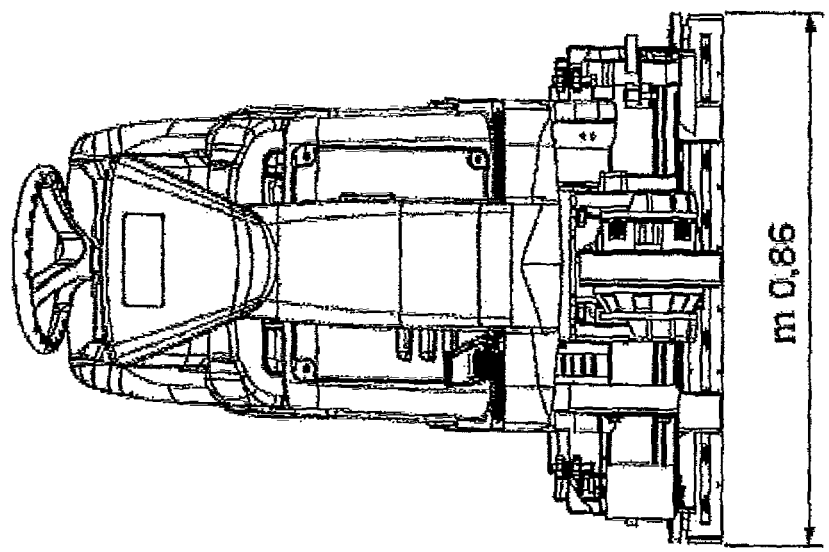

This possibility of adjusting the speed control algorithm suggests moreover some other improvements:

b) With reference to FIGS. 7a to 7c, which illustrate the three projections of a floor treatment vehicle, and on which is optionally mounted the inventive device, it can be seen that said vehicle has a track width of about 2 meters, that is much greater than the track width of the rear wheels, which is 88 cm.

In addition, its centre of gravity is shifted considerably upward, in order to:
- limit the width of the vehicle within a minimum value;
- and because its load consists basically of water tanks that are filled and emptied during the operation of the same vehicle which are arranged in its load bin on the upper rear part of the vehicle.

In fact, a floor-washing vehicle of this type is provided with two tanks: a first tank initially full of water which during its use is sprayed and spread on the floor, and that then is immediately sucked up again and fed into the second tank, which is normally located above the first tank.

Basically, both due to its geometrical dimensions and the arrangement of the load, this vehicle is inherently very unstable, if compared with a normal commercial vehicle.

In addition, since the load of the vehicle can, and in fact must vary during the operation, in other words as explained above the load of washing water is transferred, after one pass on the ground, from the lower tank to the upper tank, this can also cause an upward shift of the centre of gravity of the vehicle, with the result of further deteriorating the characteristics of stability.

A similar circumstance occurs when the vehicle is a sweeping machine, that is a machine that collects the dirt from the ground and transfers it into a collecting bin mounted on the machine itself. Since the collected material often includes significant portions of soil or, worse, fine gravel, in other words high density materials, there is in this case too a significant upward shift of the centre of gravity, which deteriorates the stability of the vehicle.

The danger of lateral tipping of the vehicle becomes even more acute when the vehicle used is of the type illustrated in FIGS. 8A to 8D; in this case, in fact, the intrinsic risk of reduced lateral stability of the vehicle is aggravated by the fact that the operator's position is even higher than the vehicle, as he sits on a seat above the vehicle. This circumstance contributes non only to worsening the lateral stability of the vehicle but also, in the event of the vehicle tipping over, the body of the operator, who is not protected by side guards, will be thrown directly on the ground.

Figure 3A:
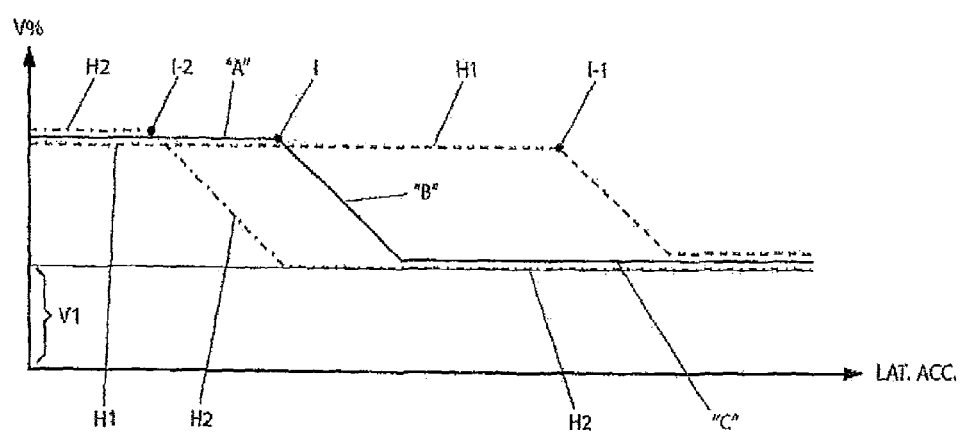
FIG. 3A illustrates on a Cartesian diagram, similar to FIG. 3, two different graphs representing two respective relationships of the maximum speed allowed for the vehicle based on lateral acceleration, with respective different machine setting modes.

To solve this problem, and referring again to FIG. 3A, the present improvement consists of modifying correspondingly the control algorithm of FIG. 3 or 5, so as to restore the original characteristics of lateral stability, or to set new, preferred characteristics of stability.

In effect, the improvement proposed herein consists of providing devices suitable to modify the algorithm in a selectively controllable manner so that the graph that represents it, and that in FIG. 3 is represented by the broken line that comprises the three segments A, B and C, can be translatable in a horizontal direction so that it can occupy a plurality of positions, such as for example the position described by the graph "H1" shifted completely to the right, or by the graph "H2" shifted completely to the left.

Based on the explanations given to this point, it is evident that the graph "H1" illustrates a control of the vehicle in which the lateral acceleration threshold (point "I-1"), in which an inventive device intervenes to limit the speed of the vehicle, is higher, and therefore it adapts better to the case of more stable vehicles, or to the case of a vehicle itself with better characteristics of stability, for example when its centre of gravity is lower.

Using the example of the vehicle described above, in which the centre of gravity rises progressively during the washing/sweeping procedure, it is therefore appropriate to select at the start of the operations the algorithm to which said graph "H1" corresponds.

Afterward, as work proceeds and thus with the progressive rise of the centre of gravity, to guarantee and maintain a suitable operating safety it is naturally necessary to reduce the speed, and said reduction can be achieved by varying the algorithm or by introducing, from a suitable memory, a series of algorithms in succession.

At the completion of the work it will naturally be evident that, in the example provided, the algorithm corresponding to graph "H2" will be inserted, allowing the minimum lateral acceleration, at point "I-2" before limiting the speed, given that in these final conditions the centre of gravity of the vehicle is the highest possible and therefore the dynamic stability of the vehicle is at its worst.

Naturally the devices, typically electronic, to introduce the algorithm change or substitution command in the control unit 9, are easily realizable by an expert in the field, and therefore they are not discussed further.

c) The foregoing improvement allows a useful completion; in fact, in certain cases the vehicle to be controlled is a large vehicle that can carry out various types of work. For example, it may carry a large bin on its upper part, or it can be provided with blades in the lower part, or, as already seen, it may be fitted with one or more tanks with a variable load.

It is evident that each of these types of loads causes an appreciable upward or downward shift of the centre of gravity of the vehicle, and it is therefore clear that its characteristics of lateral stability are thereby strongly modified.

According to the present improvement, the vehicle is equipped with means of selection suitable to set a specific algorithm, from among a plurality of algorithms stored in said control unit 9, so as to supply a signal to input in said servo-control unit 10 in order that:

a) a specific algorithm is associated to each type of load, and b) the vehicle is provided with means of selection that are simple, immediately recognizable and that can be operated by the operator of the vehicle, and suitable to select the respective algorithm for each type of load.

In practice, and to provide a simple example of implementation, it is sufficient to have on the instrument panel a multiple-position selector, in which every position is associated with one type of load; each position on said selector controls the algorithm that is designed and selected specifically for the type of load indicated for that respective selector position.

Naturally, many forms of implementation of this improvement are possible, but they are already known in the art.

It will therefore be sufficient for the operator, for each type of work for which a specific equipment or load has been mounted on the vehicle, to actuate the control that selects that type of load or work. The inventive devices will automatically enter the algorithm that has been specifically designed for that type of work, and essentially the operator will no longer have to worry about the lateral stability of the vehicle, even if it has been significantly modified with respect to the previous trim relative to a corresponding work of different type.

d) What is newly explained above paves the way for a further valuable improvement: in fact, if the load on the vehicle is considerable and if it is shifted upward, so that it significantly conditions the position of the centre of gravity, and especially if said load is variable, it is evidently necessary, in order to optimize the lateral stability of the vehicle at any instant of operation, that also its characteristics of stability be correspondingly aligned, so as to ensure the programmed conditions of safety.

This situation occurs frequently when vehicles of the floor-washing type are used, in which the water load is progressively shifted from a lower position to a higher position, naturally after the water is spread on the ground and subsequently sucked up.

Or when using a sweeper that simply sucks up and collects materials, including soil and gravel, from the ground and discharges them into a collecting bin located on the vehicle itself, normally in an elevated position.

In these conditions, the stability of the vehicle is continually modified and, if the operating conditions are not adapted accordingly, the characteristics of safety are diminished.

Thus, to adapt the running conditions to the variable load (centre of gravity), the present improvement teaches the generation of a function that represents, with the varying progression of a reference or control variable, the corresponding variation of an electric signal to send to a vehicle monitoring and control unit 9 so that it selects the algorithm that is most appropriate, and predetermined in fact according to said control signal.

Simply speaking, it will be sufficient to determine the reference value that represents the load variation with the necessary fidelity and then to also calculate, based on that function, a signal that must be suitably reprocessed to redefine the running conditions of the vehicle.

For example, in the variable that represents the load variation in the case illustrated above of two tanks that transfer (indirectly) the water load, the reference variable can be the quantity of water transferred, represented by a signal that integrates on a time base the instantaneous flow rate of pumped water. This reference signal can then be entered in an appropriate storage and calculation device suitable to generate a useful signal to modify in a predetermined and corresponding manner the shift, on the abscissa axis, of the graph that includes the three segments "A", "B" and "C" of FIG. 3.

With another example, it is possible to see that said reference variable is simply time, and, assuming that the pumping flow rate is constant, the variation of the centre of gravity is immediately calculated, as is therefore also the continually variable characteristic of stability of the vehicle.

Or, assuming that the load of material collected is also itself dependent on the operating time in a substantially linear manner, a similar logic can be applied, along with the relative operating modes and devices to achieve the present improvement.

An expert observer cannot avoid noticing that said improvement realizes in practice an automation of the previous improvement described at point C); in fact, in this case too the position in the horizontal direction of the graph of FIG. 3 is modified, but while in the previous case said modification/adjustment is carried out manually by the operator (who could also not remember such adjustment, or could carry it out in a wrong manner), with the present improvement such adjustment of the running of the vehicle based on its effective stability, carried out in continuous mode and in real time, in carried out in a completely automatic mode.

Schematically, this improvement is represented again in FIG. 2; the figure shows a further processing and storage unit 20 in which a signal 11 is received representative of the change of trim, that is the centre of gravity of the vehicle, and which processes and transmits a new signal 12 directed to said control unit 9.

Said signal 11 is thus enabled to shift the position of the graph of FIG. 3 or of the corresponding graphs so as to maintain preset conditions of safety by automatically decreasing the vehicle speed when approaching situations of risk.

It is also worthwhile to note that in this latter case two independent forms of automatism are provided, which however are coordinated for the same purpose. Said forms of automatism are:

the above-mentioned automatic speed adjustment as a function of angular acceleration, and the above-described selection of the algorithm governing the above-mentioned adjustment, as a function of variation of the load and thus of the vehicle centre of gravity.

The invention claimed is:

1. A vehicle for floor treatment, comprising:
    a frame supported by two axis on which one or more wheels are mounted, the two axis for orienting the vehicle driving in a rectilinear direction;
    an accelerometer to detect side acceleration orthogonal to said rectilinear driving direction, and to generate an electric signal depending on the side acceleration imparted to said accelerometer;
    a processor for receiving and processing said electric signal using one or more pre-defined algorithms;
    a motor to drive said wheels so as to cause them to rotate and drive said vehicle in motion; and
    an input device to be acted upon by an operator and for commanding mechanical power of said motor to control the vehicle speed,
    wherein said one or more algorithms compare the side acceleration indicated by the electric signal detected by said accelerometer with respect to a predetermined level corresponding to a predetermined side acceleration, and said processor controls said motor according to a result of said comparison of the side acceleration and said predetermined level,
    wherein the processor is configured to act on the motor so as to reduce the vehicle speed until the electric signal generated by the accelerometer is below the predetermined level corresponding to the predetermined side acceleration,
    wherein the processor is configured to act on the motor so as to keep the vehicle speed at a predetermined speed when the electric signal of said accelerometer is above a predetermined side acceleration, and
    wherein the processor reduces the vehicle speed in proportion to an increase of the side acceleration detected by said accelerometer.

2. The vehicle according to claim 1, wherein:
    a speed behavior, when over a pre-fixed level, with respect to the side acceleration, is represented by a graph having an upward concavity.

3. The vehicle according to claim 1, wherein:
    a speed behavior, when over a pre-fixed level, with respect to the side acceleration, is represented by a graph having a downward concavity.

4. The vehicle according to claim 1, further comprising:
    a selector for modifying said predetermined level of said accelerometer, above which the vehicle speed is reduced in a controlled way, from a minimum level to a selectively controllable higher level, and said processor is for controlling the vehicle speed, so that the vehicle speed can be represented, in a cartesian plane by a graph.

5. The vehicle according to claim 4, wherein:
    said selector selects a specific profile of speed behavior according to the side acceleration out of a plurality of selectable profiles, and
    each specific speed profile is associated with a specific vehicle trim or loading.

6. The vehicle according to claim 4, wherein:
    said selector selects a speed profile of speed behavior according to the side acceleration from a plurality of selectable profiles, and
    each particular speed profile is chosen according to a signal generated by said vehicle and which represents, according to pre-programmed functions, a load situation or a barycenter of said vehicle.

7. The vehicle according to claim 6, further comprising:
    a processing and storage unit for receiving said signal generated by said vehicle which represents a changing of the load situation or a vehicle trim and transmitting a new signal to said processor.

* * * * *